(12) United States Patent
Browne et al.

(10) Patent No.: US 8,414,366 B2
(45) Date of Patent: Apr. 9, 2013

(54) ACTIVE MATERIAL ENABLED PRESSURE RELEASE VALVES AND METHODS OF USE

(75) Inventors: Alan L. Browne, Grosse Pointe, MI (US); Paul W. Alexander, Ypsilanti, MI (US); Nancy L. Johnson, Northville, MI (US); James H. Shoemaker, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1205 days.

(21) Appl. No.: 12/254,692

(22) Filed: Oct. 20, 2008

(65) Prior Publication Data

US 2010/0099346 A1   Apr. 22, 2010

(51) Int. Cl.
*B60H 1/24* (2006.01)
(52) U.S. Cl. ..................... 454/162
(58) Field of Classification Search ........... 454/162; 251/129.06
See application file for complete search history.

(56) References Cited

U.S. PATENT DOCUMENTS

| 3,731,247 | A | * | 5/1973 | Levinn | 337/140 |
| 4,196,745 | A | * | 4/1980 | Schutzer | 137/512.1 |
| 4,497,241 | A | * | 2/1985 | Ohkata | 454/258 |
| 4,555,981 | A | * | 12/1985 | McCabe | 454/369 |
| 4,848,653 | A | * | 7/1989 | Van Becelaere | 236/49.3 |
| 4,958,687 | A | * | 9/1990 | Nakagawa | 169/60 |
| 4,979,672 | A | * | 12/1990 | AbuJudom et al. | 236/68 B |
| 5,022,583 | A | * | 6/1991 | Bruens | 236/49.5 |
| 5,071,064 | A | * | 12/1991 | AbuJudom et al. | 236/1 G |
| 5,533,929 | A | * | 7/1996 | Attridge, Jr. | 454/369 |
| 6,318,399 | B1 | * | 11/2001 | Backham et al. | 137/79 |
| 6,446,876 | B1 | * | 9/2002 | Stefano et al. | 236/49.3 |
| 7,063,377 | B2 | * | 6/2006 | Brei et al. | 296/187.09 |
| 7,322,376 | B2 | * | 1/2008 | Frisch | 137/625.65 |
| 7,498,926 | B2 | * | 3/2009 | Browne et al. | 340/425.5 |
| 7,597,616 | B2 | * | 10/2009 | Browne et al. | 454/155 |
| 7,866,737 | B2 | * | 1/2011 | Browne et al. | 296/193.1 |
| 7,992,795 | B2 | * | 8/2011 | Minor et al. | 236/103 |
| 8,100,471 | B2 | * | 1/2012 | Lawall et al. | 297/216.1 |
| 2005/0199845 | A1 | | 9/2005 | Jones et al. | |
| 2006/0172694 | A1 | * | 8/2006 | Gau et al. | 454/333 |
| 2007/0123158 | A1 | * | 5/2007 | Shibata et al. | 454/130 |
| 2008/0057853 | A1 | * | 3/2008 | Torilli | 454/244 |
| 2011/0138801 | A1 | * | 6/2011 | Zimmer et al. | 60/527 |

FOREIGN PATENT DOCUMENTS

GB   1076671   7/1967

* cited by examiner

*Primary Examiner* — Steven B McAllister
*Assistant Examiner* — Jamil Decker

(57) ABSTRACT

An active pressure relief valve adapted for selectively regulating a condition within an interior compartment generally includes a housing fluidly coupling the compartment to an external environment and defining an opening, an actuator including an active material element operable to effect movement of a flap relative to the opening, a load limit protector coupled to and configured to present a secondary output path for the element, when the flap is unable to move, and/or a latching mechanism coupled to, and configured to engage the flap, so as to retain the flap in a modified condition.

7 Claims, 7 Drawing Sheets

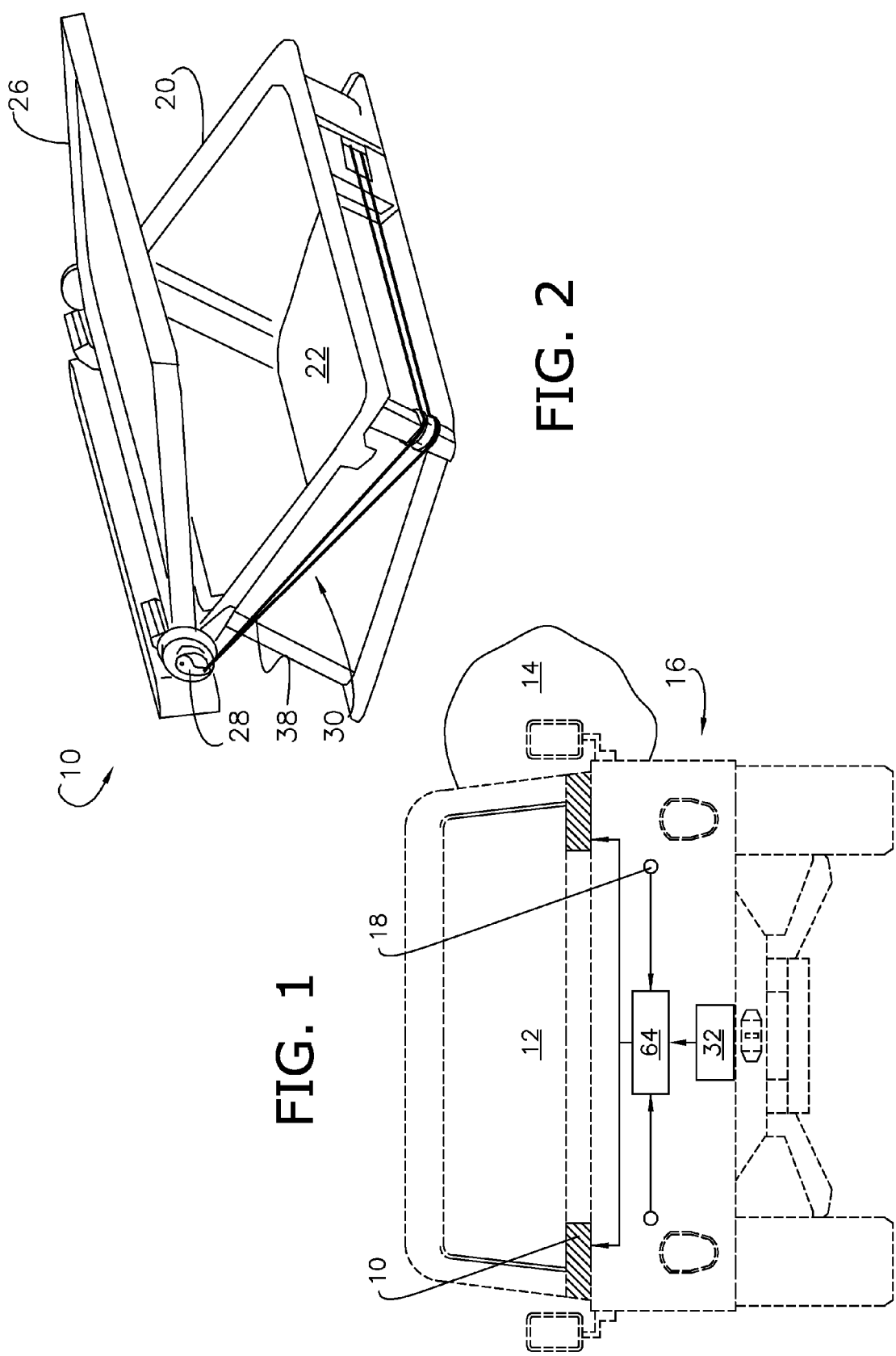

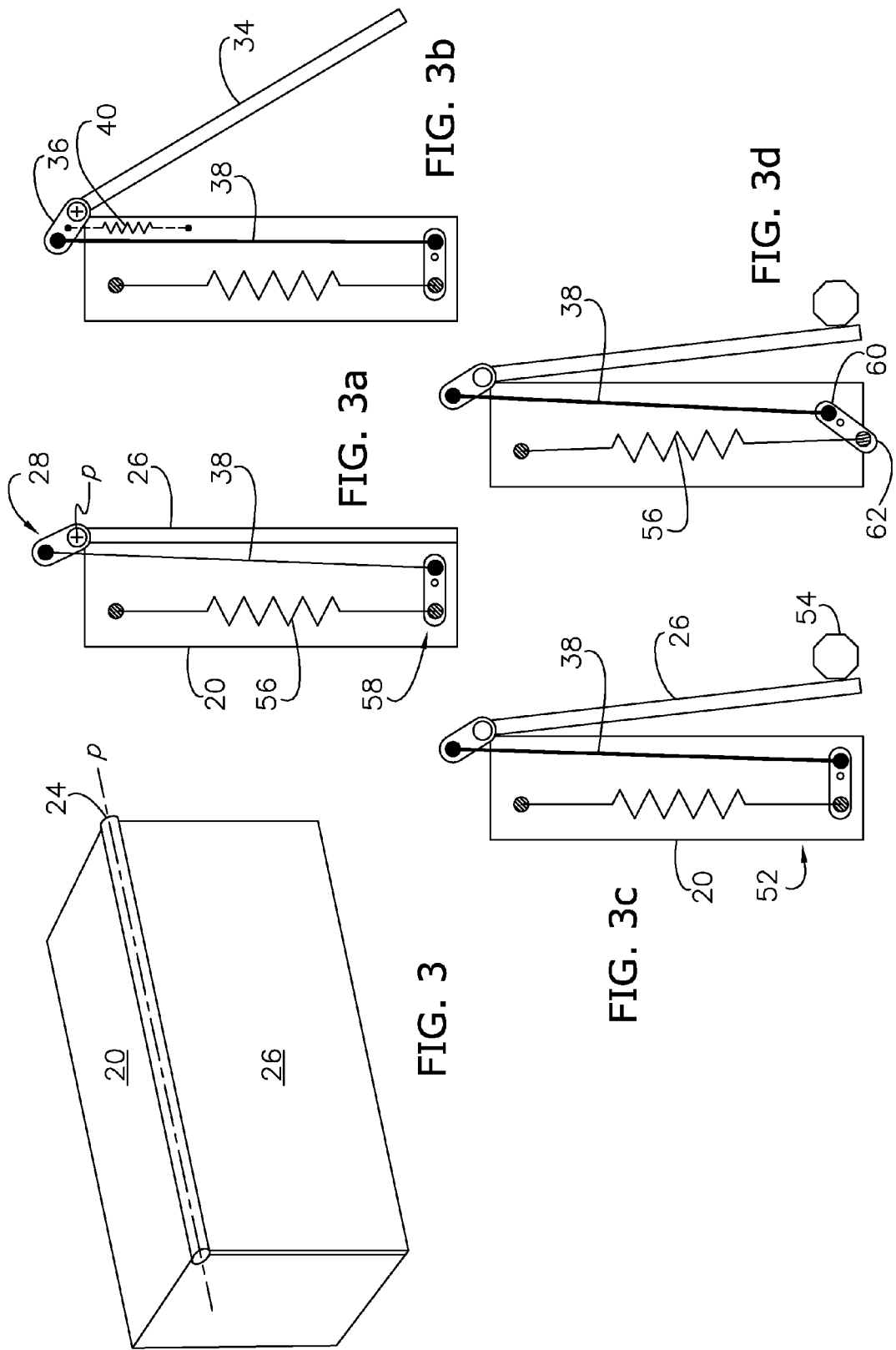

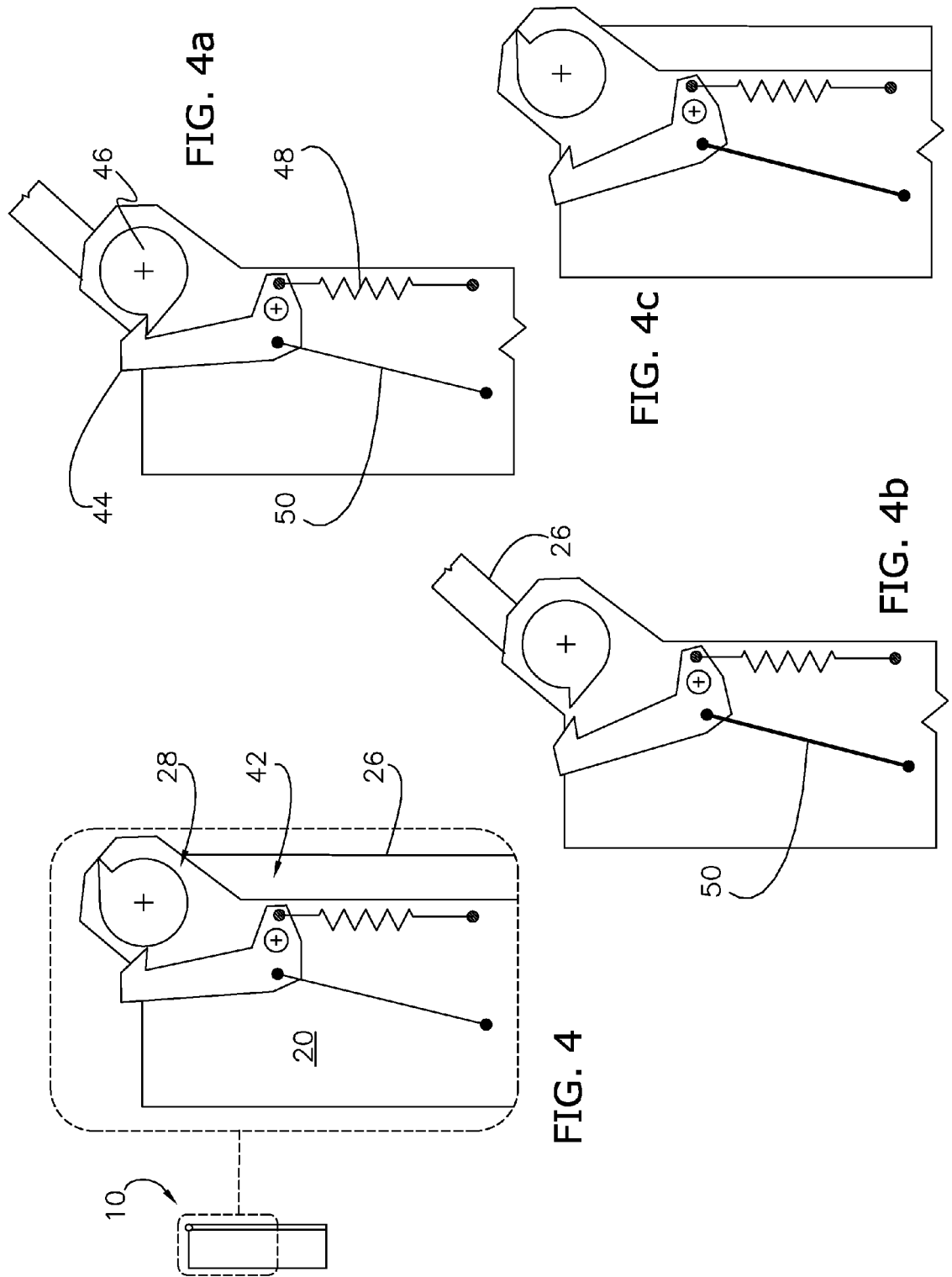

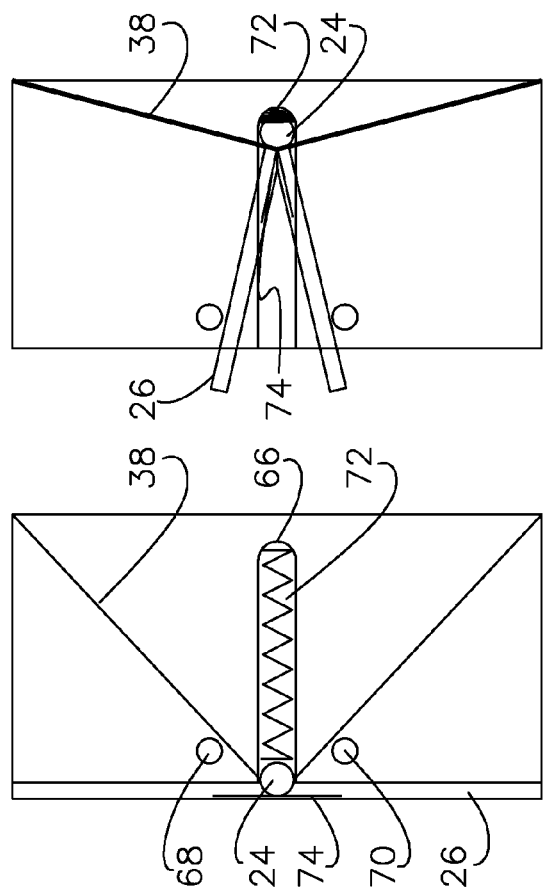
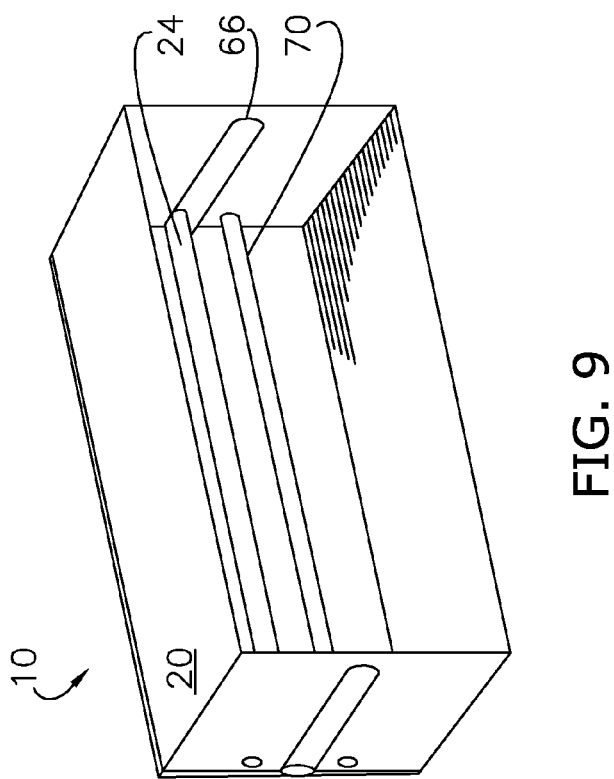
FIG. 9b
FIG. 9a
FIG. 9

ACTIVE MATERIAL ENABLED PRESSURE RELEASE VALVES AND METHODS OF USE

BACKGROUND OF THE INVENTION

1. Technical Field

This disclosure generally relates to air pressure relief valves and more particularly, to pressure relief valves and methods of regulating conditions within an interior compartment utilizing active material actuation.

2. Background Art

It is appreciated that pressure differentials between interior spaces or compartments and the external environment can cause undesirable conditions. For example, in an automotive setting, it can cause an increase in "boom" (i.e., low level noise discomfort), required door closure force, and especially when sudden, discomfort to the occupants of the space. As such, pressure relief valves (PRV's) for reducing pressure differential, which may increase upon the closure of a swing panel (e.g., door, lift flap, rear hatch, etc.) or window, activation of the HVAC system or air bag deployment, opening of a window during movement of the vehicle, so as to cause a Bernoulli effect. These valves are generally located within an interior panel that interfaces with the compartment and the environment (e.g., the structural panel between the rear seat and trunk compartment, the structural panel between the floor and the external environment, the structural panel between the dashboard and the engine compartment, and the like). Structurally, conventional PRV's include at least one conduit fluidly coupling the interior space and exterior environment, and a movable flap (e.g., gate) disposed over an opening defined by the conduit. The flap is passively manipulated in response to the pressure differential. For example, when air pressure within the interior compartment is greater than the external air pressure, the flap opens to compensate for as well as alleviate the increased pressure; and, when the interior compartment air pressure is less than the external air pressure the movable flap covers the opening to prevent air from entering the interior compartment.

More recently, active PRV's, which utilize a drive mechanism to open and/or close the flap, have been developed to address some of the limitations of passive PRV's. In these configurations, pressure differential is no longer required to actuate the PRV; instead, through sensory or manual input, it is appreciated that active PRV's can be triggered by and used to address other conditions, such as poor air quality either interior or exterior to the compartment, excessive temperature, a detect by a sensor, and the operation or status of an associated system. Active PRV's, however, also present various concerns in the art. For example, prior art active PRV's, including those that utilize motors, solenoids, and active material actuation (such as presented by co-owned U.S. Pat. No. 7,204,472 A) to effect the motion of the flap, typically require constant power to maintain the valve in the manipulated condition. This invariably results in a drain upon the power supply. Moreover, with respect to prior art active material based PRV's, the lack of load limit protection resulting in an inability to avoid failure and the costs associated therewith is also of concern. For example, it is appreciated that where the opening of the flap is blocked by a foreign object, the active material element in these PRV's may overheat, become damaged, or otherwise fail.

BRIEF SUMMARY

In response to the afore-mentioned concerns, the present invention recites an enhanced active material based PRV adapted for use with an interior compartment, such as that of a vehicle. As a result of the reversible change characteristics exhibited by active materials, the invention is useful among other things for selectively reducing pressure differential, wherein selectivity is based upon a variety of autonomously or manually determined condition. As a result, the invention is useful for reducing boom or air bind, as well as, improving/increasing ventilation, on-demand and via remote control. Other advantages of the invention include providing zero power vent position hold via a latching mechanism. Finally, it is appreciated that the novel use of active material elements presented herein reduces weight and/or complexity in comparison to counterpart mechanical, electro-mechanical, hydraulic, or pneumatic based systems; and with respect to prior-art active material PRV's, increases energy efficiency and reduces the likelihood of failure and costs associated.

A first aspect of the invention concerns a pressure relief valve adapted for use with and for modifying a condition of an interior compartment of a vehicle. The valve includes a housing defining an opening in fluid communication with the compartment and an external environment, a flap pivotally connected to the housing, so as to be caused to swing between open and closed conditions, and an actuator drivenly coupled to the flap. The flap is configured to cover at least a portion of the opening in the closed condition and not to obstruct the opening, so as to allow fluid flow between the compartment and environment, in the open condition. The actuator includes an active material element effective to undergo a reversible change in fundamental property when exposed to an activation signal. The change is operable to cause the flap to swing between the open and closed conditions, so as to achieve a modified condition. The inventive actuator further includes a load limit protector coupled to and configured to present a secondary output path for the element, when the flap is unable to swing between open and closed conditions, and/or a latching mechanism coupled to, and configured to engage the flap, so as to retain the flap in the modified condition even when the change is reversed (e.g., the activation signal is discontinued).

A second aspect of the invention concerns a related method of selectively modifying a condition of an interior compartment. The method includes the steps of fluidly coupling the compartment to an external environment through an opening, so as to allow fluid flow therebetween, securing an active material element relative to the opening, and determining a sample value of the condition. Once determined, the sample value is compared to a threshold, so as to determine a non-compliant condition value when the sample value exceeds the threshold. The element is activated when the non-compliant condition value is determined. The opening is caused to close or open as a result of activating the element, and the condition is modified as a result of opening or closing the opening.

Other aspects and advantages of the present invention, including the employment of shape memory alloys, shape memory polymers, and other active materials for actuating, latching mechanisms for use with, and various configurations of active-material based PRV's will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 1 is an elevation view of a vehicle including a plurality of active-material PRV's coupled to first and second sensors, a controller and a power supply, in accordance with a preferred embodiment of the invention;

FIG. 2 is a perspective view of an active PRV, in accordance with a preferred embodiment of the invention;

FIG. 3 is a perspective schematic view of a PRV having a single swing-door, in accordance with a preferred embodiment of the present invention;

FIG. 3a is a side elevation of the PRV shown in FIG. 3, particularly illustrating the flap in a closed condition and an active-material actuator, including a shape memory wire and biasing spring, drivenly coupled thereto;

FIG. 3b is a side elevation of the PRV shown in FIGS. 3-3a, wherein the flap is in an open condition caused by the activation of the wire;

FIG. 3c is a side elevation of the PRV shown in FIGS. 3-3b, wherein the motion of the flap is obstructed by a foreign object, as the wire is being activated;

FIG. 3d is a side elevation of the PRV shown in FIGS. 3-3c, wherein the load limit protector is engaged to provide a secondary output path for the element, as a result of the blockage;

FIG. 4 is a side elevation of an active-material based PRV, particularly illustrating the pivot axis of the flap, and a ratchet based latching mechanism including a pawl, gear connector, shape memory wire and biasing spring in enlarged caption view, in accordance with a preferred embodiment of the present invention;

FIG. 4a is an enlarged caption view of the pivot axis and latching mechanism shown in FIG. 4, wherein the flap has been swung to an open condition, such that the pawl is engaged by the gear;

FIG. 4b is an enlarged caption view of the pivot axis and latching mechanism shown in FIG. 4, wherein the wire has been activated, so as to disengage the pawl and gear;

FIG. 4c is an enlarged caption view of the pivot axis and latching mechanism shown in FIG. 4, wherein the flap has returned to the closed condition but the wire has not been allowed to cool;

FIG. 9 is a perspective view taken from the interior of a PRV having a collapsing flap and medially located joint, a shape memory wire in a bow-string configuration, and a conduit defining a slot in which the joint is caused to translate by the bow-string wire, in accordance with a preferred embodiment of the present invention;

FIG. 9a is a side elevation of the PRV shown in FIG. 9, particularly illustrating the flap in a closed condition; and FIG. 9b is a side elevation of the PRV shown in FIG. 9, particularly illustrating the flap in a fully open condition, wherein the wire has been activated and the joint translated.

DETAILED DESCRIPTION

Figure 6:
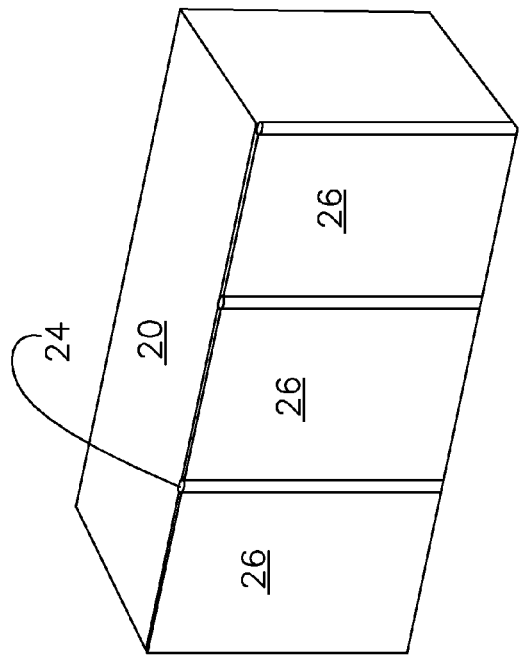
FIG. 6 is a perspective view of an active material based PRV having multiple vertical pivot axes and associated flaps, in accordance with a preferred embodiment of the present invention.
Figure 5:
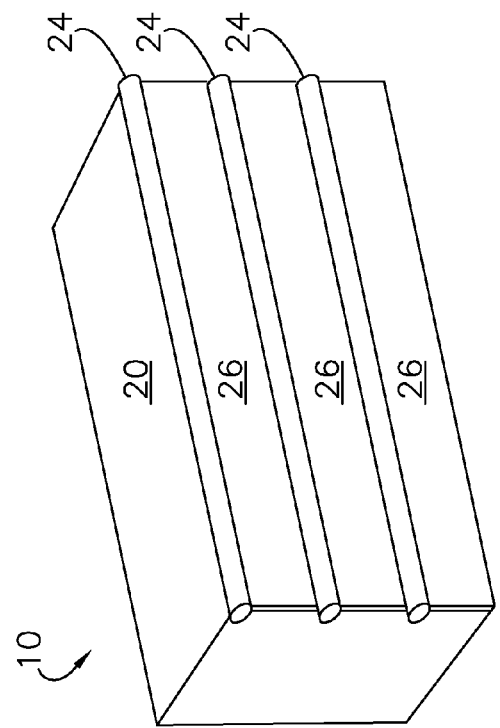
FIG. 5 is a perspective view of an active material based PRV having multiple horizontal pivot axes and associated flaps, in accordance with a preferred embodiment of the present invention.

The present invention concerns novel configurations of an active material actuated pressure relief valve (PRV) 10 and methods of manipulating a cooperatively defined condition, such as pressure differential, between an interior compartment or space 12 and an exterior environment 14. In the illustrated and preferred embodiments discussed herein active material based PRV's 10 are employed and utilized with respect to a vehicle 16, such as an automobile, truck, SUV, boat cabin, or airplane; however, it is appreciated that the advantages and benefits of the present invention may be used in other applications or wherever controlling conditions, such as pressure differential or air flow between fluidly coupled spaces is desired. For example, it is appreciated that the present invention may be applied to residential and commercial registers.

In the present invention, the use of the active materials provides a means for selectively opening and closing the pressure relief valves in the presence or absence of an air pressure differential. As such, the active pressure relief valves disclosed herein possess added functionality than previously known. For example, as will be disclosed in greater detail herein, the preferred PRV can be programmed to open upon detection of a condition or event. That is to say, the preferred PRV 10 may be programmed (or passively configured) to open when a certain temperature within the interior compartment is exceeded, so that the PRV functions as a "smart" vent operable to selectively cool the interior compartment; and, where the vehicle includes a sensor 18 for detecting carbon monoxide concentration, for example, the active pressure relief valve could be configured to open when a certain concentration of carbon monoxide is detected within, thereby allowing excess carbon monoxide to diffuse from the interior compartment 12. Likewise, as further discussed herein, other sensors 18, such as thermocouples, thermistors, barometers, pre-impact sensors, moisture detectors, or the like, can be similarly utilized to detect other conditions and trigger PRV function.

It is appreciated by those of ordinary skill in the art that a plurality of modes of operation exists for utilizing the active PRV 10 of the present invention, including but not limited to a) wherein one or more active material actuators cause the valve flap(s) to open, b) wherein one or more active material actuators cause the valve flap(s) to close, c) wherein one or more active material actuators cause the valve flap(s) to both open and close, or d) wherein one or more active materials are used to selectively open and close selectable individual or subgroups of elements of a multi-element flap. Exemplary embodiments of these cases are illustrated and further described in part (II) below.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include but are not limited to shape memory materials such as shape memory alloys, and shape memory polymers. Shape memory materials generally refer to materials or compositions that have the ability to remember their original at least one attribute such as shape, which can subsequently be recalled by applying an external stimulus. As such, deformation from the original shape is a temporary condition. In this manner, shape memory materials can change to the trained shape in response to an activation signal. Exemplary shape memory materials include the afore-mentioned shape memory alloys (SMA) and shape memory polymers (SMP), as well as shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, various combinations of the foregoing materials, and the like.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Shape memory alloys exist in several different temperature-dependent phases. The most commonly utilized of these phases are the so-called Martensite and Austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously suitable for airflow control.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two way by nature. Application of sufficient stress when an SMA is in its Austenitic phase will cause it to change to its lower modulus Martensitic phase in which it can exhibit up to 8% of "superelastic" deformation. Removal of the applied stress will cause the SMA to switch back to its Austenitic phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between martensite and austenite. Additionally FSMA's are ferromagnetic and have strong magnetocrystalline anisotropy, which permit an external magnetic field to influence the orientation/fraction of field aligned martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for rail filling applications. External magnetic fields are generally produced via soft-magnetic core electromagnets in automotive applications, though a pair of Helmholtz coils may also be used for fast response.

Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material at the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require continuous power to remain in their lower modulus state. Thus, they are suited for reversible shape setting of the insert 10.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives;

all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Active-Material PRV's, Methods, and Applications

Turning to the structural configuration of the invention, there is shown various embodiments of an active pressure relief valve 10 that utilizes active material actuation in FIGS. 1-10. In general, the PRV 10 includes a housing (or conduit) 20 defining an opening 22 (FIG. 2); a hinge 24 rotate-ably mounted to the housing 20; a rigid flap 26 in pivotable communication with the hinge 24; and a control connector 28 in operative communication with an active material based actuator 30. The housing 20 may be fixedly mounted to the vehicle 16, as shown in FIG. 1, or other structure. Though singularly described and illustrated, it is appreciated that a plurality of PRV's may be utilized, and separately controlled with respect to the interior compartment (FIG. 1).

The opening 22 is in fluid communication with the interior compartment 12 and the external environment 14. In this manner, selective opening and closing of the flap 26 can be used to regulate fluid flow between the interior compartment 12 and the external environment 14. To further prevent fluid flow, the PRV 10 may further comprise an elastic seal (not shown) disposed about the opening 22, and intermediate the flap 26 and housing 20, so as to be compressed thereby. Also as further described below, multiple flaps operating in unison or individually, or other adjustment means, can be employed to variably control fluid communication.

A power supply 32 is in operative communication with the actuator 30 and operable to provide a suitable activation signal (FIG. 1). The power supply 32 may be automatically demanded via remote control, and regulated by a PWM, regulator, or power resistor in-series. For example, in the case of actuators comprising thermally activated shape memory material, a current can be supplied by the power supply 32 to effect Joule heating, when demanded by a vehicle occupant (not shown). Alternatively, the power supply 32 may come from an ambient energy or condition source, such as radiation from the Sun, so that the PRV 10 is passively activated.

Referring to FIGS. 3-3d, there is shown a PRV 10 having a rigid flap 26 pivotally mounted along the top of the housing 20, so as to define a pivot axis, p. Connector 28 presents a swing arm that defines a pivot point concentrically aligned with the pivot axis of the flap 26, a long arm 34, and a short arm 36. The long arm 34 coextends with the flap 26 and defines a first arm length equal to the longitudinal dimension of the flap 26. The short arm 36 presents a second arm length preferably less than half, more preferably less than one-quarter, and most preferably less than one-eighth of the first arm length.

An active material element 38 of defined length is attached to the short arm 36. In FIGS. 3-3d, the element 38 consists of a shape memory wire that is attached at one end to the short arm 36 and to the housing 20 or vehicle 16 at the other end. Upon activation by the power supply 32, the length of the wire 38 decreases causing the rigid flap 26 to pivot about its axis. Upon discontinuing the activation signal, the wire 38 returns to its original dimension or undergoes a plastic deformation, depending on the active material employed to effect closure of the flap 26. As shown in FIG. 3a-b, once activated the wire 38 is caused to swing as a result of rotation by the short arm 36; to prevent stress accumulation and/or buckling at the other end, it is desirous to pivotally connect the wire 38 and housing 20.

It is appreciated that the preferred wire 38 presents stress and strain values of 170 MPa and 2.5%, respectively, so as to result in a sealing force of 2N, when activated, and that between 2.5 to 12 V, and 2 amps of current are required to actuate the PRV 10.

More preferably, as shown in FIG. 3b an extension spring 40 is also attached to the short arm 36 and configured to produce the plastic deformation and/or effect closure of the flap 26, so that the flap 26 is maintained against the housing 20 in the power-off state (alternatively, a torsion spring may be disposed about the pivot axis and configured to act in the same manner). The bias spring 40 is able to stretch the shape memory wire 38, so as to cause stress-induced transformation to a martensite phase, in addition to that caused by cooling.

With respect to case b) above, it is appreciated that the afore-mentioned configurations could be reversed, wherein a compression spring (not shown) works to drive the flap 26 open and the wire 38 works to selectively close the valve. With respect to case c), it is also appreciated that two antagonistic active material actuators 30, one which would open, and another which would close the flap 26 (or alternatively, a single actuator having a two-way effect), could be utilized.

An aspect of the invention concerns the inclusion of a load limit protector 52 to provide strain/stress relief capability, and thereby increase the life of the element 38. In this regard, it is appreciated that when an active material undergoes transformation, but is prevented from undergoing the resultant physical change (e.g. heating a stretched SMA wire above its transformation temperature but not allowing the wire to revert to its unstressed state), detrimental affects to the materials performance and/or longevity can occur. In the present invention, for example, it is foreseeable that the flap 26 could by constrained from moving when actuated, either by a foreign object 54 (FIGS. 3*c-d*) or another form of impediment (e.g., a deformed out body panel blocking motion or ice/mud build up on the valve flap). As such, to prevent damage to the actuator element 38, a secondary output path to the triggered motion is preferably included, which allows the element 38 to respond to the activation signal while the condition of flap 26 remains unchanged.

For example, the wire 38 may be further connected to an extension spring 56 placed in series therewith, opposite the connector 28 (FIGS. 3*a-d*). The spring 56 is stretched to a point where its applied preload corresponds to the load level where it is appreciated that the actuator 30 would begin to experience excessive force if blocked. As a result, activation of the actuator 30 will first apply a force trying to open the flap 26, but if the force level exceeds the preload in the spring (e.g., the flap 26 is blocked), the wire 38 will instead further stretch the spring, thereby providing an output path for the wire strain, and preserving the integrity of the active PRV 10.

More preferably, and as shown in FIGS. 3-3*d*, the protector 52 may further include a lever 58 intermediate the element 38 and spring 56. The lever 58 defines first and second arms 60,62 and a pivot axis. The element 38 is attached to one of the arms, so as to be spaced from the axis a first distance. The spring 56 is attached to the other arm and spaced from the axis a second distance greater than the first, so as to provide mechanical advantage.

If overload protection fails, it is also appreciated that a mechanical link, such as a cable (not shown) attached to the interior of a PRV 10 that could be accessed and pulled to close the PRV 10 should it fail in a partially to fully open condition, especially in the case of embodiments with a bias spring opening and active material based closing mechanisms.

The inventive PRV 10 preferably includes a latching mechanism, such as the type shown in FIGS. 4-4*c*. In this configuration the mechanism includes a pawl 44 resistively pivotable about an axis between engaged and disengaged positions, and the connector 28 presents a rotatable gear 46 defining at least one tooth configured to catch the pawl 44 when in the engaged position. More preferably, the gear 46 has a plurality of teeth so as to be able to engage the pawl 44 at a plurality of incremental positions resulting in variable degrees of opening (e.g., between 17° and 52°) for the flap 26. In the illustrated embodiment, a biasing latch spring 48 attached to the pawl 44 is configured to cause the mechanism 42 to engage the flap 26, and a second active material element (e.g., shape memory wire) 50 presenting an activation force greater than the spring modulus of the spring 48 is oppositely attached to the pawl 44. As shown in FIG. 4*b*, the second element 50 is operable to cause the mechanism 42 to disengage and release the flap 26, when activated. Alternatively, it is appreciated that the roles of the element 50 and spring 48 may be reversed by switching their connection points relative to the pawl 44; that is to say the second element 50 could be configured to cause the mechanism 42 to engage the flap 26 when activated, and the biasing spring 48 presents a spring modulus less than the activation force, so as to be configured to cause the mechanism 42 to disengage and release the flap 26, only when the second element 50 is deactivated.

Based on these configurations, actuation times of less than five seconds, an approximate lifetime of 100,000 actuations, and a working environment between −40 to 90° C. have been observed.

Figure 7A:
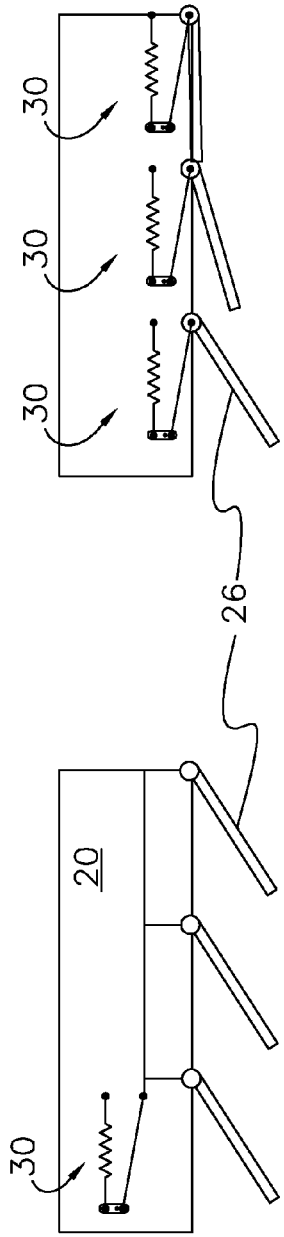
FIG. 7a is a side elevation of the PRV shown in FIG. 7, wherein a plurality of separately functioning active material actuators engages the flaps to varying degrees, in accordance with a preferred embodiment of the present invention.
Figure 7:
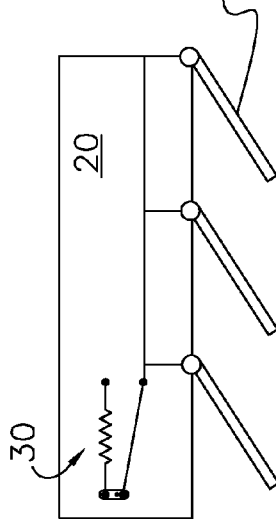
FIG. 7 is a side elevation of the PRV shown in FIG. 5, and a top elevation of the PRV shown in FIG. 6, wherein a single active material actuator engages the flaps, in accordance with a preferred embodiment of the present invention.

In other embodiments, FIGS. 5-7*a* depict PRV's 10 having a plurality of horizontal or vertically oriented flaps 26 that are each pivotally connected to the housing 20 so as to define an equal plurality of pivot axes. A single actuator 30 may be connected to each of the flaps 26 and configure to effect congruent motion, as previously described and shown in FIG. 7, or more preferably, a separate active material actuator 30 may control movement of an associative flap 26 as shown in FIG. 7*a*. Again, the flaps 26 are preferably biased so as to sealingly close a portion of the opening, when the associative element 38 is deactivated. It is also within the ambit of the invention to variously employ rotating, folding, sliding or iris-type flaps 26 consistent with the invention.

Figure 8A:
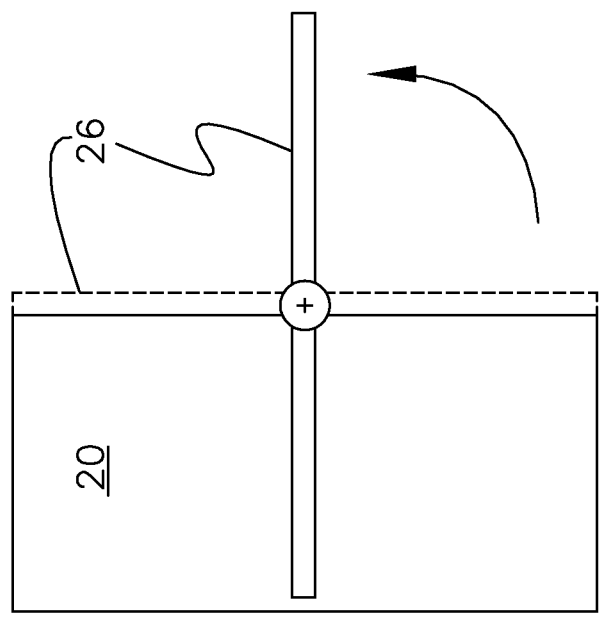
FIG. 8a is a side elevation view of the PRV shown in FIG. 8, wherein the flap is shown swung to a fully open condition, and in hidden-line type, back to the fully closed condition.
Figure 8:
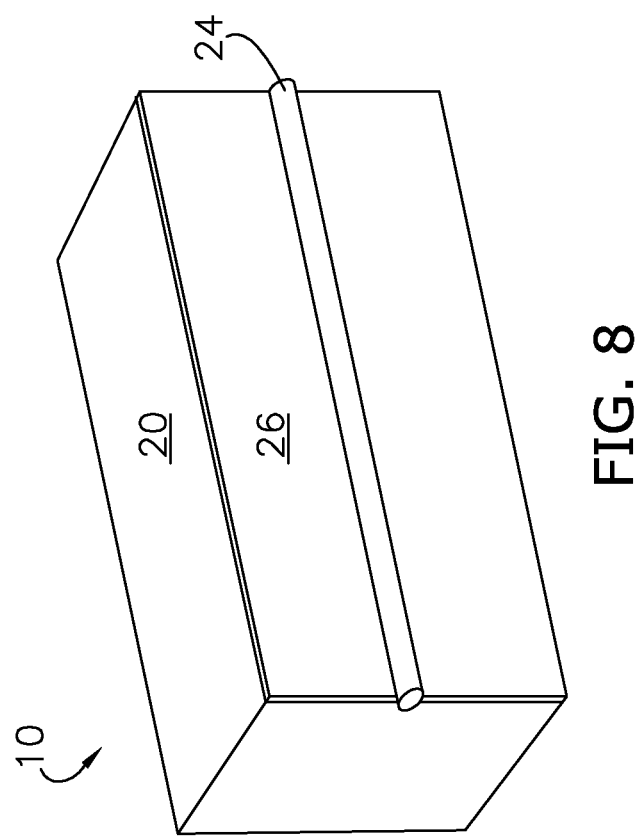
FIG. 8 is a perspective view of a single flap PRV having a pivot axis medially located, in accordance with a preferred embodiment of the present invention.
Figure 10:
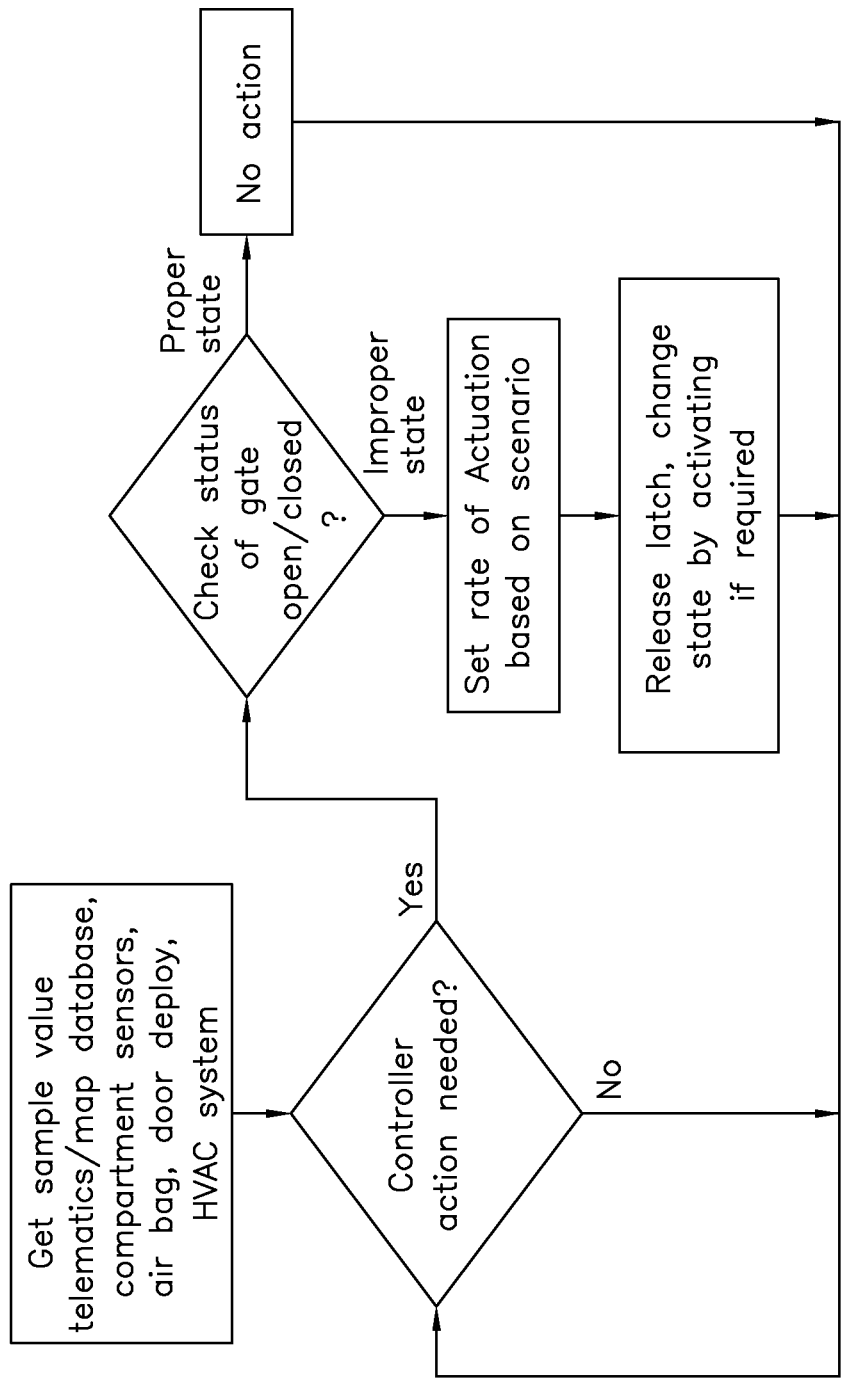
FIG. 10 is a flow diagram of an active-material based PRV process, in accordance with a preferred embodiment of the present invention.

In another embodiment, the flap 26 may present a medial pivot axis, so as to be able to rotate about its longitudinal mid-line, as shown in FIGS. 8 and 8*a*. In this configuration it is appreciated that half of the flap extends within the housing 20 when in the open condition resulting in less protrusion into the compartment 12. It is contemplated that other active material based actuators, such as a torque tube coupled with an antagonistically biased torsion spring, may be implemented in this configuration.

Finally, in yet another preferred embodiment, the housing 20 may define a medial slot 66 and include first and second flap engaging cross-members 68,70 opposite the slot 66 (FIGS. 9-9*b*). The flap 26, in this configuration, is collapsible about a medial pivot joint formed by a hinge 24. The joint is disposed within the slot 66. The members 68,70 cause the flap 26 to collapse by folding, when the joint is caused to translate towards the interior of the housing 20. In this configuration, a shape memory wire 38 is preferably coupled to the joint and defines a bow-string configuration (FIGS. 9*a,b*). As a result of trigonometric relationship, when the wire 38 is activated, the bow-string configuration causes the joint to translate a distance greater than the wire displacement (i.e., change in length). A return spring 72 presenting a spring modulus less than the activation force of the wire 38 is disposed within the slot 66 and configured to maintain engagement with, so as to bias the joint outward. Finally, a torsion spring 74 is coaxially aligned with the hinge 24, attached to the flap 26, and configured such that as the flap 26 is caused to collapse, i.e., by the translation of the joint inward, the spring 74 is caused to store potential energy. When the wire 38 is deactivated and the joint is caused to travel outward, the torsion spring 74 releases its energy, so as to further cause the flap 26 to returns to and be sealed in the closed condition.

In operation, selective opening of the rigid flap 26 can be effected by a controller 64 communicatively coupled to the power supply 30, and sensor(s) 18 and/or input device. The controller 64 can be preprogrammed to have the power supply 32 deliver the activation signal using algorithms based on sensor input, as previously described and exemplary represented in FIG. 10. For example, air pressure can be monitored with a sensor to indicate when a window is opened during vehicle movement, when an air bag is actuated, or upon door closing, or the like. Alternatively, other sensor inputs such a temperature indicating that the interior temperature of the vehicle has exceeded a pre-set temperature threshold, and the like can be employed. Still, other sensor inputs can include a gas sensor such as may be desired for detecting carbon monoxide concentration within the interior compartment.

In other embodiments, it is appreciated that the operation (either opening or closing) of the PRV 10 could be triggered by the actuation of an HVAC system operable to treat the interior compartment 12, or by receiving telematics information cooperatively determined from a GPS or other positioning system and a map database (FIG. 10); both of which being also communicatively coupled to the controller 64, and suitable for implementation in an automotive setting, for example.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Suitable algorithms, processing capability, and sensor inputs are well within the skill of those in the art in view of this disclosure. This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A pressure relief valve adapted for use with and for modifying a condition of an interior compartment of a vehicle, said valve comprising:

a housing defining an opening in fluid communication with the compartment and an external environment;

a flap pivotally connected to the housing, so as to be caused to swing between open and closed conditions, and configured to cover at least a portion of the opening in the closed condition and not to obstruct the opening, so as to allow fluid flow between the compartment and environment, in the open condition: and an actuator drivenly coupled to the flap, and including an active material element effective to undergo a reversible change in fundamental property when exposed to an activation signal, wherein the change is operable to cause the flap to swing between the open and closed conditions, so as to achieve a modified condition, said actuator further comprising a load limit protector coupled to and configured to present a secondary output path for the element, when the flap is unable to swing between open and closed conditions, wherein the protector includes a stretched spring connected in series to the element and a lever intermediate the element and spring, the lever defines first and second arms and a pivot axis, the element is attached to one of said arms and spaced from the axis a first distance, and the spring is attached to the other of said arms and spaced from the axis a second distance greater than the first.

2. The valve as claimed in claim 1, wherein said actuator further comprising a latching mechanism coupled to, and configured to engage the flap, so as to retain the flap in the modified condition when the change is reversed.

3. The valve as claimed in claim 2, wherein the active material is selected from the group consisting essentially of shape memory alloys, ferromagnetic shape memory alloys, shape memory polymers, piezoelectric materials, electroactive polymers, magnetorheological fluids and elastomers, and electroreheological fluids.

4. The valve as claimed in claim 2, wherein the latching mechanism includes biasing spring configured to cause the mechanism to engage the flap, and a second active material element presenting an activation force greater than the spring modulus of the spring, so as to be operable to cause the mechanism to disengage and release the flap, when the mechanism is engaged with the flap and the second element is activated.

5. The valve as claimed in claim 2, wherein the latching mechanism includes a second active material element presenting an activation force and configured to cause the mechanism to engage the flap when activated, and a biasing spring presenting a spring modulus less than the activation force, so as to be configured to cause the mechanism to disengage and release the flap, when the mechanism is engaged with the flap and the second element is deactivated.

6. The valve as claimed in claim 2, wherein the mechanism includes a pawl resistively pivotable between engaged and disengaged positions, and a rotatable gear defining at least one tooth configured to catch the pawl when in the engaged position.

7. The valve as claimed in claim 1 wherein the actuator includes a shape memory wire presenting a change in length when activated or deactivated, and the wire is coupled to the flap at a point, and defines a bow-string configuration, such that the point is caused to translate a distance greater than the change in length.

* * * * *